UNITED STATES PATENT OFFICE.

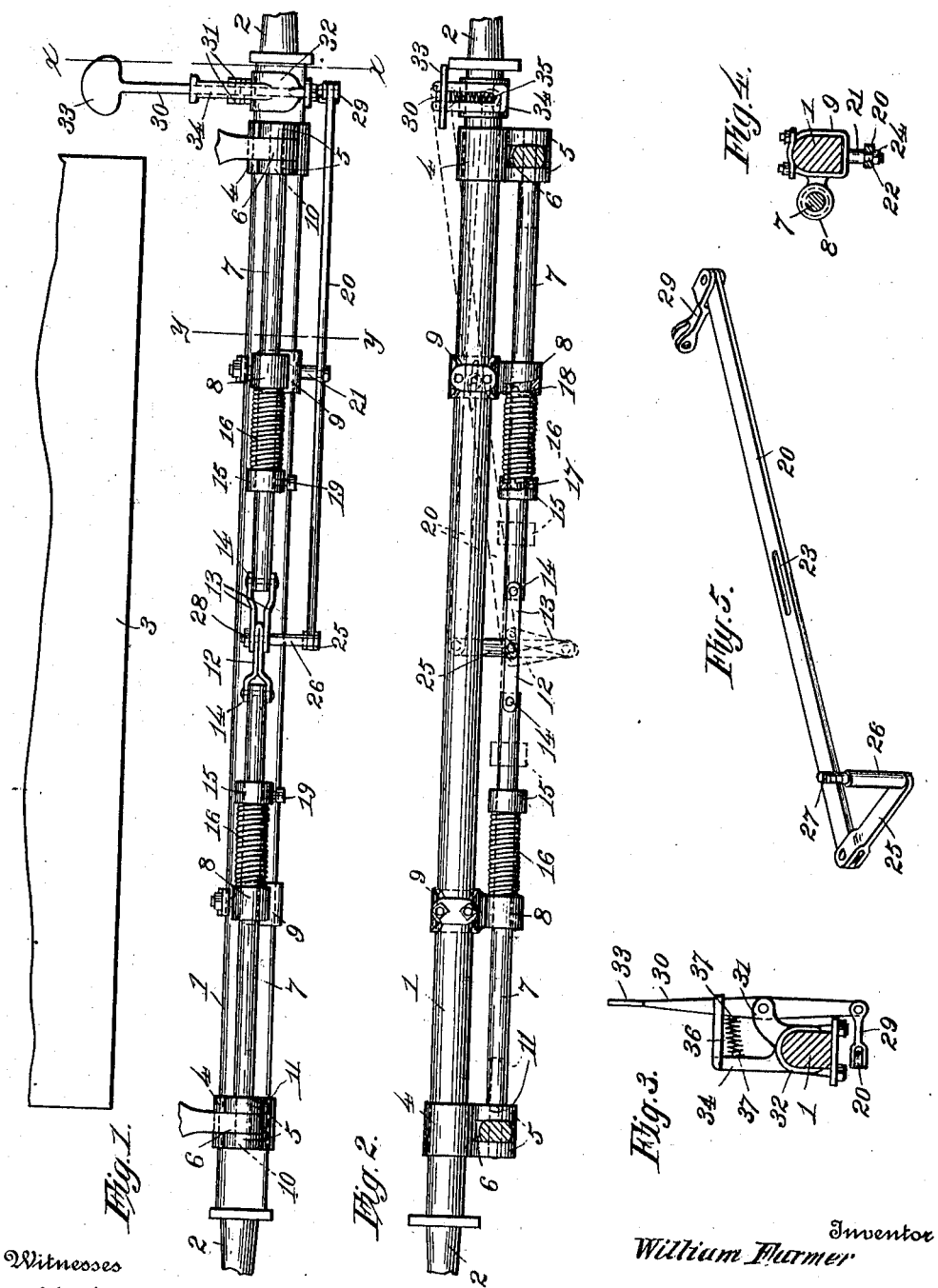

WILLIAM FARMER, OF JAMES RIVER, VIRGINIA, ASSIGNOR OF ONE-HALF TO SAMUEL F. POINDEXTER, OF LYNCHBURG, VIRGINIA.

HORSE-DETACHER.

993,044.  Specification of Letters Patent.  Patented May 23, 1911.

Application filed May 7, 1910. Serial No. 559,961.

*To all whom it may concern:*

Be it known that I, WILLIAM FARMER, a citizen of the United States, residing at James River, county of Amherst, and State of Virginia, have invented certain new and useful Improvements in Horse-Detachers, of which the following is a specification.

My invention relates to horse detachers, that is, to devices whereby a horse may be readily detached from a vehicle when running away or beyond control of the driver.

The object of my invention is to provide improved means whereby the shafts may be readily detached from the axle when desired or found necessary.

A further object of my invention is to provide a device of the class mentioned which shall be of simple construction and which may be readily applied to the axle of the vehicle.

A further object of my invention is to provide a device as mentioned which may be easily operated and which will not readily get out of order.

Other objects will appear hereinafter.

With these objects in view my invention consists generally in a pair of rods or plungers arranged upon the front axle of the vehicle and having their ends extending through the eyes of the thill couplings to connect the shafts to the axle. The inner ends of said rods or plungers are connected by toggle levers, which when in alinement with the plungers maintain the outer ends thereof in said eyes. A lever is pivotally mounted on the axle and connected at one end with the toggle levers and at the other end to a lever adapted to be operated by the foot of the driver whereby pressure on the foot lever will operate the toggle levers to withdraw the plungers or rods from the eyes of the thill couplings, thereby releasing the shafts. Suitable springs are provided which normally tend to withdraw the plungers from the thill couplings and which assist in the operation of the device as soon as the toggle levers are thrown out of alinement with the plungers.

My invention further consists in various details of construction and arrangements of parts all as will be fully described hereinafter and particularly pointed out in the claims.

My invention will be more readily understood by reference to the accompanying drawings forming a part of this specification and in which—

Figure 1 is a front view of the front axle of a vehicle equipped with a shaft detaching device embodying my invention in its preferred form, the usual springs between the shaft and the body of the vehicle and the fifth wheel being omitted, Fig. 2 is a plan view of the same, Fig. 3 is a transverse section on the line $x$—$x$ of Fig. 1, Fig. 4 is a transverse section on the line $y$—$y$ of Fig. 1, and Fig. 5 is a perspective view of the lever and links which connect the toggle levers with the foot lever.

Referring now to the drawings 1 indicates the front axle of a vehicle terminating at its ends in the usual spindles 2, and 3 indicates in diagram the body of the vehicle. The springs between the body and the axle are not shown as to include the same would merely tend to confuse the drawing, it being understood that any form of the usual springs may be employed. The axle is provided adjacent its ends with the usual clips or bands 4, each having a pair of eyes 5 to receive the eyes 6 of the shafts between them.

Slidably mounted on the axle 1 is a pair of rods or plungers 7 arranged in alinement with each other and with the eyes 5 and 6. The eyes 5 and 6 are usually upon the front of the axle, in which case the rods 7 are also arranged upon the front thereof, and I have so illustrated it in the drawings. The rods 7 are arranged to slide in sleeves 8 formed on clips 9 which are secured to the axle 1 between the bands 4 and the center of the axle, preferably substantially half way between the same. The outer ends of the rods 7 are reduced in diameter as at 10 to extend through the eyes 5 and 6 and forming a shoulder 11 which limits the outward movement of the rod.

The inner ends of the rod 7 are connected by toggle levers 12 and 13, the former comprising a single arm bifurcated at the end to receive its respective rod and the latter comprising a pair of arms pivotally connected to the former and arranged one above and one below the same as clearly shown in Fig. 1. The levers 12 and 13 are pivotally connected to the inner ends of their respective rods 7 by bolts or rivets 14. The rod 7 and the toggle levers are so proportioned that when they are in alinement with each other, as shown in full lines in Figs. 1 and 2, the shoulders 11 of the rods will abut the inner faces of the inner eyes 5 and thereby maintain the rods and levers properly centered on the axle; and that when the rods are retracted their inner ends will abut to limit their inward movement and maintain the ends of the rods in the inner eyes 5 as shown in dotted lines in Fig. 2.

Secured to each of the rods 7 is a sleeve or collar 15, between which and the sleeve 8 are arranged springs 16 which tend to retract the rods 7 from the thill couplings. The rods are maintained in extended or operative position against the tension of the springs by the toggle levers 12 and 13 when the latter are in alinement with the rods, but as soon as said levers are moved out of alinement to partially withdraw the rod, the springs will complete the operation. To prevent rattling of the springs 16 on the rods 7 the collars 15 and sleeves 8 are provided with recesses 17 and 18 respectively to receive the ends of the same as shown in Fig. 2. The collars 15 are preferably adjustably secured to the rods 7 by set screws 19 to the end that the tension of the spring 16 may be regulated.

Pivotally mounted beneath the axle 1 is a lever 20 which extends from substantially the center of the axle to adjacent the end thereof. This is pivoted to one of the clips 9 or an arm or lug 21 formed thereon and extending downwardly therefrom as shown in Figs. 1 and 4. The arm or lug 21 is provided with a reduced extension 22 which projects through a slot 23 formed longitudinally in the lever 20 and is threaded to receive a nut 24 to hold the lever in position. Pivotally connected to the inner arm of the lever 20 is a link 25 which extends forwardly to a point directly beneath the toggle levers, and its forward end is provided with an upwardly projecting extension or arm 26, reduced at its upper end as at 27 to extend through the toggle levers and form the pivotal connection for the same. The upper end of the reduced portion 27 is threaded to receive a nut 28 by which the parts are secured together.

To the opposite end of the lever 20 from that to which the link 25 is connected, is pivoted a link 29 which is also connected to the lower end of a vertically disposed foot lever 30, the latter projecting upwardly between the body of the wagon and the wheel and in position to be readily reached by the driver. The lever 30 is pivotally mounted between ears 31 formed on a clip 32 secured to the axle between one of the bands 4 and the adjacent spindle. It is obvious that by pressing the upper end or foot piece 33 of the lever 30 forwardly the toggle levers 12 and 13 will be moved out of alinement with the rods 7 after which the spring 16 will quickly retract the rods to release the shafts. The clip 32 is also provided with a guide for the lever 30 to prevent lateral movement of the same. This comprises an upwardly extending arm 34 having its upper end turned rearwardly and bifurcated forming a slot or guide 35. Interposed between the lever 30 and the arm 34 is a spring 36 which is of sufficient tension to prevent accidental displacement of said lever and consequent operation of the device. The spring 36 is maintained in position by lugs 37 formed on the lever and the arm and which project into the ends of the spring.

It is obvious that with the device described a horse may be readily detached from the vehicle when necessary or desired. Further the device may be readily attached to substantially any axle by simply removing the bolts which extend through the ears 4 and 5 and securing the clips 9 and 32 in position.

Having described my invention what I claim as new and desire to secure by Letters Patent is:

1. In a device of the class described, a vehicle axle and eyes thereon to receive the shaft eyes between them, in combination with a pair of rods slidably mounted on the axle and having reduced outer ends to extend through said eyes and forming shoulders to abut the same when in operative position, the inner ends of said rod being adapted to abut when said rods are retracted to form stops for each other, toggle levers connecting the inner ends of said rods, the distance between the shoulders on said rods when said toggle levers are in alinement therewith being substantially the same as the distance between the inner eyes on the axle and the distance between the outer ends of the rods when retracted being slightly greater than the distance between said eyes, and means for retracting said rods when desired, substantially as described.

2. In a device of the class described, a pair of clips adapted to be secured to a vehicle axle, a sleeve on each of said clips, a rod slidably mounted in each of said sleeves, toggle levers connecting the inner ends of said rods, a third clip adapted to be secured to the axle adjacent the end thereof, a foot lever pivotally mounted on said third clip, a lever pivotally mounted on one of the first said clips and beneath the same and means connecting the ends of the last said lever with said toggle levers and said foot lever respectively, substantially as described.

3. In a device of the class described, a vehicle axle, rods slidably mounted on said axle, toggle levers connecting the inner ends of said rod, a clip adapted to be secured to the axle adjacent one end thereof, a foot lever pivotally mounted on said clip, an upwardly extending arm on said clip, a guide on said arm for said foot lever, a spring for holding said lever in normal position and means operatively connecting said toggle arms and said foot lever, substantially as described.

In testimony whereof I have signed my name to this specification in the presence of two subscribing witnesses.

WILLIAM FARMER.

Witnesses:
W. E. S. VAUGHN,
JNO. W. CHILDS.

Copies of this patent may be obtained for five cents each, by addressing the "Commissioner of Patents, Washington, D. C."